No. 753,862. PATENTED MAR. 8, 1904.
A. L. ELIEL & J. LA BURT.
WRENCH.
APPLICATION FILED MAR. 19, 1903.
NO MODEL.
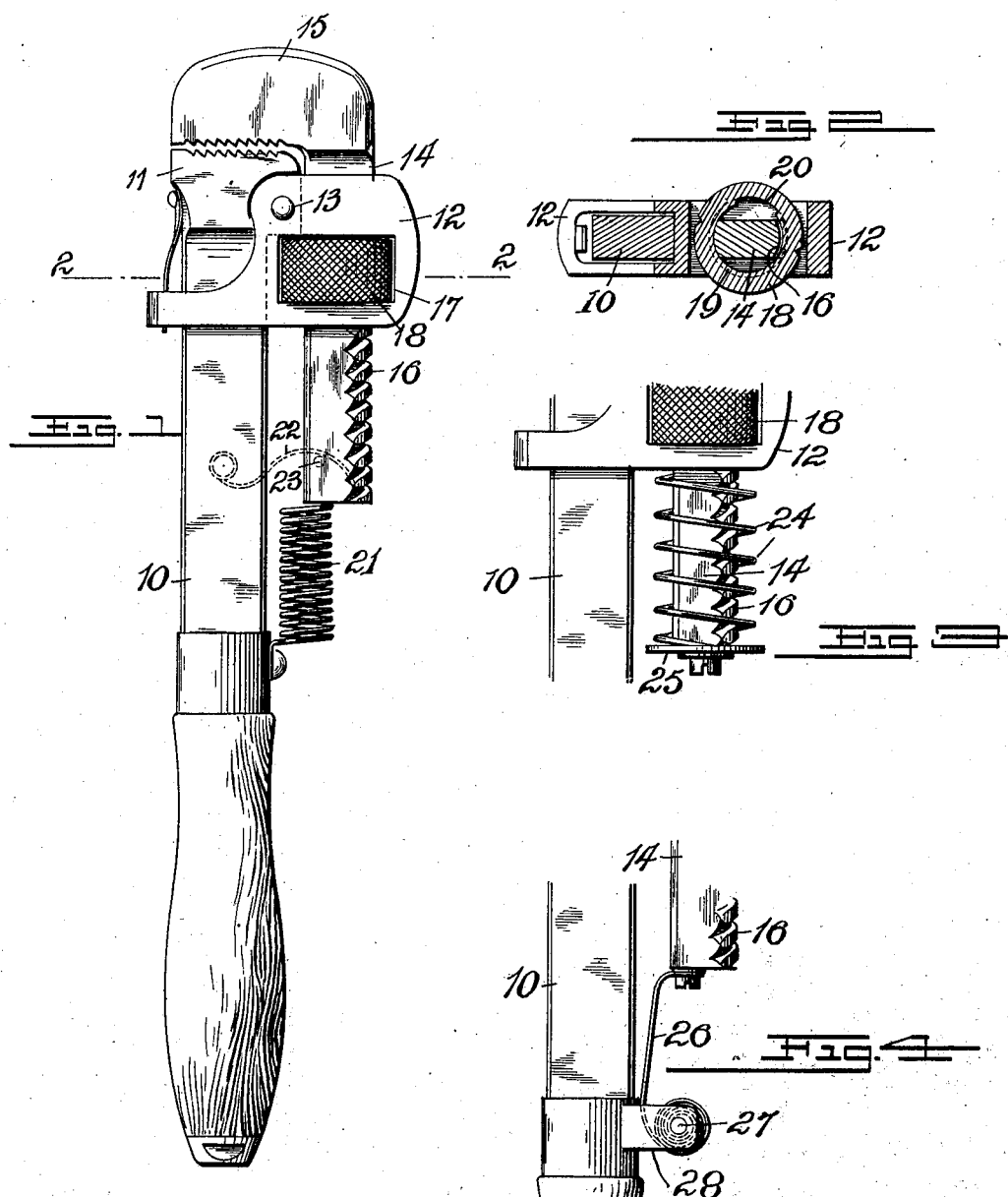
WITNESSES:
J.S.Dunbar
John Carolan.
INVENTORS:
Albert L. Eliel, and
John La Burt.
BY
Wm H. Camfield, ATTORNEY.

No. 753,862. Patented March 8, 1904.

UNITED STATES PATENT OFFICE.

ALBERT L. ELIEL, OF PARLIN, NEW JERSEY, AND JOHN LA BURT, OF NEW YORK, N. Y., ASSIGNORS TO THEMSELVES, AND CARL D. BRADLEY, OF PARLIN, NEW JERSEY.

WRENCH.

SPECIFICATION forming part of Letters Patent No. 753,862, dated March 8, 1904.

Application filed March 19, 1903. Serial No. 148,522. (No model.)

*To all whom it may concern:*

Be it known that we, ALBERT L. ELIEL, of Parlin, Middlesex county, New Jersey, and JOHN LA BURT, of New York, Kings county, New York, have invented certain new and useful Improvements in Wrenches, of which the following is a full, clear, and exact description.

This invention relates to a wrench that is of the class adjustable to embrace different-size nuts or pipes, and the device is illustrated as applied to a Stilson wrench; but of course it can be used on any kind of adjustable wrench.

The object of the invention is to provide a means for releasing the adjustable jaw so that it is free to slide at a certain point in the nut's rotation; and another object is to provide a means for returning the adjustable jaw when it is in its free relation to the other jaw to its closed position when the wrench is not embracing anything.

Reference is to be had to the accompanying drawings, forming part of this specification, in which similar numerals of reference refer to similar parts throughout the several views.

Figure 1 is a side view of a wrench of our new style, and Fig. 2 is a section on the line 2 2 in Fig. 1. Figs. 3 and 4 are views of modified forms of a returning means.

In the drawings a shank 10 is provided, as usual, with a jaw 11. A clip 12 is secured to the shank 10 with a slight pivotal motion, with the pin 13 as a fulcrum. A shank 14 slides through the clip 12, and a jaw 15 is arranged to oppose the jaw 11. A thread 16 is arranged on one edge of the shank 14, and in an opening 17 in the clip 12 is arranged a nut 18. This nut 18 is internally threaded, as at 19, and the thread is mutilated or cut away at the point 20 at a distance slightly in excess of the width of the shank 14. When the nut is turned as in Fig. 2, it provides a fine adjustment between the jaws 11 and 15; but when it is turned so as to bring the mutilation 20 opposite the thread 16 the shank 14 is free to be worked so as to adjust the opposed jaws. It will thus be seen that to get a quick and approximate adjustment the nut 18 is turned as last described and the shank 14 slid out to the required distance, and then a slight turn on the nut will provide an exact adjustment.

After the nut is used and it is desired to close it it is necessary simply to turn the nut until the shank 14 is free, when a spring 21, secured to its bottom end and to the lower end of the shank 10, will operate to pull it down, so as to close the wrench. When a workman desires to use the wrench with one hand if the other is engaged, he can turn the nut so as to free the shank 14, press the shank up from the bottom with his thumb, and catch the jaw 15 over the element to be grasped by the range, and the jaw 11 can be pulled to embrace the opposed side, and then the nut by a slight turn locks the wrench. Instead of the spring 21 we may employ the spring 22, (shown in dotted outline in Fig. 1,) which can bear against a pin 23 on the shank 14 on the outside, or the spring 22 can be arranged in a slot cut into each shank.

Instead of a tension-spring, as shown in 21, we may encircle the shank 14 by a spring 24, (shown in Fig. 3,) which can be arranged to exert a pressure on a washer 25 on the end of the shank 14 and the bottom edge of the clip 12.

Another way of drawing back the adjustable portion of the wrench is shown in Fig. 4, in which we attach a coil-spring 26 to the bottom edge of the shank 14, the other end of the spring being coiled and fastened to a pin 27, supported on a plate or plates 28, attached to the bottom end of the shank 10. This spring is arranged to pull back the shank 14 by coiling up around the pin 27.

It will thus be evident that we have devised an adjustable wrench that is easily operated, quickly adjusted, simply arranged, and one that will be normally closed and ready for instant manipulation.

Having thus described our invention, what we claim as new, and desire to secure by Letters Patent, is—

1. A wrench comprising a pair of shanks having opposed jaws, a thread on one of the said shanks, said shanks being adjustable to one another, a nut for adjusting the jaws, said nut having threads engaging with the thread on one of the shanks, a mutilation in the thread of the nut to release the shank, when the mutilation on the nut is in line with the thread of the shank, and a spring arranged on the outside and connecting the movable shank with the unthreaded shank to close the jaws when they are in sliding relation.

2. A wrench comprising a shank having a jaw on one end, a second shank adjustably arranged to the first shank and having a jaw opposed to the jaw on the first shank, a thread on one edge of the adjustable shank, a nut on the unthreaded shank, said nut having a thread arranged to engage the thread on the adjustable shank, a mutilation on the thread of the nut so that the adjustable jaw is released when the mutilation on the nut is in line with the thread on the shank, and a spring arranged on the outside of the first-mentioned shank bearing on the adjustable shank to close the jaws when they are released.

3. In a wrench comprising a pair of shanks sliding in relation to one another, opposed jaws on the shanks, a spring on the outside of the wrench arranged to connect the shanks, and acting to limit the open relation of the jaws, and to close the jaws when the shanks are released.

In testimony whereof we have hereunto set our hands in the presence of two subscribing witnesses.

ALBERT L. ELIEL.
JOHN LA BURT.

Witnesses:
WM. H. CAMFIELD,
J. G. DUNBAR.